US007012630B2

(12) United States Patent
Curry et al.

(10) Patent No.: US 7,012,630 B2
(45) Date of Patent: Mar. 14, 2006

(54) SPATIAL SOUND CONFERENCE SYSTEM AND APPARATUS

(75) Inventors: James E. Curry, Herndon, VA (US); Alexander I. McAllister, Wheaton, MD (US); Patricia V. Hatton, Laurel, MD (US)

(73) Assignee: Verizon Services Corp., Arlington, VA (US)

( * ) Notice: Subject to any disclaimer, the term of this patent is extended or adjusted under 35 U.S.C. 154(b) by 190 days.

(21) Appl. No.: 08/598,457

(22) Filed: Feb. 8, 1996

(65) Prior Publication Data

US 2003/0081115 A1    May 1, 2003

(51) Int. Cl.
    *H04R 5/00*    (2006.01)
(52) U.S. Cl. .............................. 348/15; 381/17; 381/26; 379/202.01
(58) Field of Classification Search .................. 381/26, 381/74, 17, 1, 310; 348/14–15, 17, 20; 379/202–5, 202.01
    See application file for complete search history.

(56) References Cited

U.S. PATENT DOCUMENTS

| 3,962,543 | A | * | 6/1976  | Blauert et al. ............. 381/310 |
| 4,068,091 | A | * | 1/1978  | Doi .............................. 381/26 |
| 4,359,605 | A |   | 11/1982 | Haramoto et al. |
| 4,400,724 | A |   | 8/1983  | Fields |
| 4,581,758 | A |   | 4/1986  | Coker et al. |
| 4,734,934 | A | * | 3/1988  | Boggs et al. ........... 379/202.01 |
| 4,739,513 | A |   | 4/1988  | Kunugi et al. |
| 4,815,132 | A | * | 3/1989  | Minami ........................ 381/1 |
| 4,910,779 | A | * | 3/1990  | Cooper ........................ 381/26 |
| 5,020,098 | A |   | 5/1991  | Celli |
| 5,031,216 | A |   | 7/1991  | Görike et al. |
| 5,105,462 | A | * | 4/1992  | Lowe et al. .................. 381/17 |
| 5,173,944 | A | * | 12/1992 | Begault ....................... 381/17 |
| 5,272,757 | A | * | 12/1993 | Scofield et al. ............. 381/381 |
| 5,335,011 | A |   | 8/1994  | Addeo et al. |
| 5,347,306 | A |   | 9/1994  | Nitta |
| 5,371,799 | A | * | 12/1994 | Lowe et al. .................. 381/17 |

(Continued)

OTHER PUBLICATIONS

Begault, Durand R., 3-D Sound for Virtual Reality and Multimedia, 1994, Academic Press, Inc., pp. 213-216.*

(Continued)

*Primary Examiner*—Sinh Tran
*Assistant Examiner*—Walter F Briney, III
(74) *Attorney, Agent, or Firm*—Leonard C. Suchyla, Esq.; Joel Wall, Esq.; Fullbright & Jaworski LLP

(57) ABSTRACT

The spatial sound conference system enables participants in a teleconference to distinguish between speakers even during periods of interruption and overtalk, identify speakers based on spatial location cues, understand low volume speech, and block out background noise using spatial sound information. Spatial sound information may be captured using microphones positioned at the ear locations of a dummy head at a conference table, or spatial sound information may be added to a participant's monaural audio signal using head-related transfer functions. Head-related transfer functions simulate the frequency response of audio signals across the head from one ear to the other ear to create a spatial location for a sound. Spatial sound is transmitted across a communication channel, such as ISDN, and reproduced using spatially disposed loudspeakers positioned at the ears of a participant. By inserting a spatial sound component in a teleconference, a speaker other than the loudest speaker may be heard during periods of interruption and overtalk. Additionally, speakers may be more readily identified when they have a spatial sound position, and the perception of background noise is reduced.

14 Claims, 6 Drawing Sheets

U.S. PATENT DOCUMENTS

| | | | |
|---|---|---|---|
| 5,390,177 A * | 2/1995 | Nahumi | 370/268 |
| 5,404,406 A | 4/1995 | Fuchigami et al. | |
| 5,436,975 A * | 7/1995 | Lowe et al. | 381/17 |
| 5,440,639 A * | 8/1995 | Suzuki et al. | 381/17 |
| 5,512,938 A * | 4/1996 | Ohno | 379/202 |
| 5,555,310 A * | 9/1996 | Minami et al. | 381/17 |
| 5,598,478 A * | 1/1997 | Tanaka et al. | 381/17 |
| 5,657,246 A * | 8/1997 | Hogan et al. | 348/515 |
| 5,734,724 A * | 3/1998 | Kinoshita et al. | 381/17 |
| 5,751,694 A * | 5/1998 | Toft | 348/14.01 |
| 5,757,929 A * | 5/1998 | Wang et al. | 381/301 |

OTHER PUBLICATIONS

Ludwig, L.F., Cohen, M., Extending the Notion of a Window System to Audio, 1990, COMPUTER, 23, pp. 66-72.*

Koizumi et al., Design of Virtual Conferencing Environments in Audio Telecommunications. In AES: Proc. Audio Engineering Society Conv., Wien, Austria, Mar. 1992. 4CA1.04, preprint 3304.*

Durand R. Begault, 3-D Sound for Virtual Reality and Multimedia, Aug. 2000 facsimile reprint of 1994 edition, Preface to the NASA Technical Memorandum versioin, and pp. 31-67, 95-112.*

Durand R. Begault, *3-D Sound for Virtual Reality and Multimedia* 10-21, 148-53, 191-239, 247-85 (1994).

Durand R. Begault, *Challenges to the Successful Implementation of 3-D Sound*, 39 J. Audio Eng. Soc. 864-70 (1991).

Mark D. Lee & David A. Burgess, *The Percpetion of Location Using Synthetic Auditory Localization Cues: Accuracy and the Effects of Stimulus Bandwidth*, Ga. Inst. Tech.

David A. Burgess & Jouke C. Verlinden, *A First Experience with Spatial Audio in a Virtual Environment*, Graphics, Visualization, and Usability Center, College of Computing, Ga. Inst. Tech.

Wojtek Furmanski, *Virtual Reality for K-12 Education*, Syracuse University.

Spatial Audio Work in the Multimedia Computing Group.

Rhett Hudson, *DT-5: Enabling Technologies Desktop Video Conferencing*.

Michael R. Macedonia & Donald P. Brutzman, *MBone Provides Audio and Video Across the Internet*.

Warp, Virtual TV Overview.

Hemi-Sync Learning Systems, The Monroe Institute.

Van L. Speakerworks.

*ISDN Overview*, http://www.cis.ohio-state . . . e/ISDN/overview.html.

Dave Cherkus, et al., comp.dcom.isdn FAQ Part 2 of 5: General Topics, http://www.cis.ohio-state . . . n-faq/part2/faq.html, Jul. 1, 1995.

* cited by examiner

SPATIAL SOUND CONFERENCE SYSTEM AND APPARATUS

BACKGROUND OF THE INVENTION

1. Field of the Invention

This invention relates to implementing spatial sound in systems that enable a person to participate in an audio conference with other people across a network. Specifically, this invention relates to a system that increases the comprehensibility of one or more speakers to enhance a participant's ability to listen to a specific speaker when multiple persons are talking, to aid in the identification of a speaker by using spatial location cues, and to decrease the perception of background noise. This invention also relates to providing spatial sound in an audio or audiovisual conference, a long distance learning system, or a virtual reality environment.

2. Discussion of the Related Technology

Spatial sound can be produced using a head-related transfer function. Head-related transfer functions have been estimated using dummy heads replicating a human head. Due to the shape of the pinna and the human head, microphones placed at the ear locations of a dummy head pick up slightly different sound signals. Differences between these sound signals provide spatial location cues for locating a sound source. Several dummy heads, some complete with ears, eyes, nose, mouth, and shoulders, are pictured in Durand R. Begault, 3-*D Sound for Virtual Reality and Multimedia*, 148–53 (1994) (Chapter 4: Implementing 3-D Sound). U.S. Pat. No. 5,031,216 to Görike, et al. proposes a partial dummy head having only two pinna replicas mounted on a rotate/tilt mechanism. These dummy heads are used in recording studios to manufacture binaural stereo recordings; they are not used in a teleconference environment.

In teleconference environments, integrated services digital network (ISDN) facilities are increasingly being implemented. ISDN provides a completely digital network for integrating computer, telephone, and communications technologies. ISDN is based partially on the standardized structure of digital protocols as developed by the International Telegraph and Telephone Consultative Committee (CCITT, now ITU-T), so that, despite implementations of multiple networks within national boundaries, from a user's point of view there is a single uniformly accessible worldwide network capable of handling a broad range of telephone, facsimile, computer, data, video, and other conventional and enhanced telecommunications services.

An ISDN customer premise can be interconnected with a local exchange (local telephone company) to an ISDN switch. At the customer premise, an "intelligent" device, such as a digital PBX, terminal controller, or local area network, can be connected to an ISDN termination. Non-ISDN terminals may be connected to an ISDN termination through a terminal adapter, which performs D/A and A/D conversions and converts non-ISDN protocols to ISDN protocols. Basic rate ISDN provides several channels to each customer premise, namely a pair of B-channels that each carry 64 kilobits per second (kbs) of data, and a D-channel that carries 16 kbs of data. Generally, the B-channels are used to carry digital data such as pulse code modulated digital voice signals. Usually, data on the D-channel includes call signalling information to and from the central office switch regarding the status of the customer telephone, e.g., that the telephone has gone off-hook, control information for the telephone ringer, caller identification data, or data to be shown on an ISDN telephone display.

Additionally, an Advanced Intelligent network (AIN) has been developed that overlays ISDN facilities and provides a variety of service features to customers. Because an AIN is independent of ISDN switch capabilities, AIN services can easily be customized for individual users. U.S. Pat. Nos. 5,418,844 and 5,436,957, the disclosure of which is incorporated by reference herein, describe many features and services of the AIN.

In a teleconference environment, several methods have been suggested to transmit sound with varying degrees of sound source location information. U.S. Pat. No. 4,734,934 to Boggs, et al. proposes a binaural teleconferencing system for participants situated at various locations. Each participant has a single microphone and a stereo headset, and a conference bridge connects the participants together. A monaural audio signal from each participant's microphone is transmitted to the conference bridge. The conference bridge adds time delays to the audio signal to produce an artificial sound source location ambience. The time delays added to each incoming monaural signal simulate the location of conference participants as being in a semi-circle around a single listener. The conference bridge then transmits the delayed signals to the conference participants. This system uses a simple time delay to simulate different locations for conference participants; it does not use head-related transfer functions to create spatial sound signals representing the virtual location of each conference participant.

U.S. Pat. No. 5,020,098 to Celli proposes using left and right microphones for each participant that transmit a digitized audio signal and a phase location information signal to a conference bridge across ISDN facilities. The conference bridge then uses the transmitted location information to control the relative audio signal strengths of loudspeakers at the other participants' stations to simulate a position in the station for each remote participant. Again, this system does not use head-related transfer functions to place conference participants in different virtual locations.

U.S. Pat. No. 4,815,132 to Minami proposes a system for transmitting sound having location information in a many-to-many teleconferencing situation. This system includes right and left microphones that receive audio signals at a first location. Based on the differences between the right and left audio signals received by the microphones, the system transmits a single channel and an estimated transfer function across ISDN facilities. At a receiving location, the right and left signals are reproduced based on the single channel signal and the transfer function. Afterwards, the reproduced signals are transmitted to right and left loudspeakers at the receiving station. This system also does not use head-related transfer functions to create a virtual location for each conference participant.

None of these described systems use head-related transfer functions in a teleconference environment. Thus, these systems do not truly produce spatial sound to place conference participants in a virtual location for ease in identifying speakers and distinguishing speech.

SUMMARY OF THE INVENTION

The spatial sound conference system enables participants in a teleconference to distinguish between speakers even during periods of interruption and overtalk, identify speakers based on virtual location cues, understand low volume speech, and block out background noise. Spatial sound information may be captured using a dummy head at a conference table, or spatial sound information may be added to a participant's monaural audio signal using head-related transfer functions based on an assigned virtual location of a speaker. Spatial sound signals may be reproduced on spatially disposed loudspeakers preferably positioned near the ears of a listener. The spatial sound conference system is designed to enable conferences across a digital network. Aside from purely audio conferences, the system can provide spatial sound to audiovisual conferences, long distance learning systems, or virtual reality environments implemented across a network.

Head-related transfer functions simulate the frequency response of audio signals across the head from one ear to the other ear to create a spatial location for a sound. A computer-generated head-related transfer function convolved with a single audio signal creates left and right audio signals with a spatial sound component. Head-related transfer functions may also be created by recording left and right audio signals at the ears of a human head or a dummy head. By inserting a spatial sound component in a teleconference, either using a dummy head or spatial sound conference bridge having head-related transfer functions, a speaker other than the loudest speaker may be heard during periods of interruption and overtalk. Additionally, speakers may be more readily identified when they have a virtual location as established using spatial sound, and the perception of background noise is reduced. The term "speaker" as used herein is not limited to an individual talking, but may be any audio source having an actual or assigned virtual location relative to a listener or another speaker.

DETAILED DESCRIPTION OF THE PREFERRED EMBODIMENT

Figure 1:
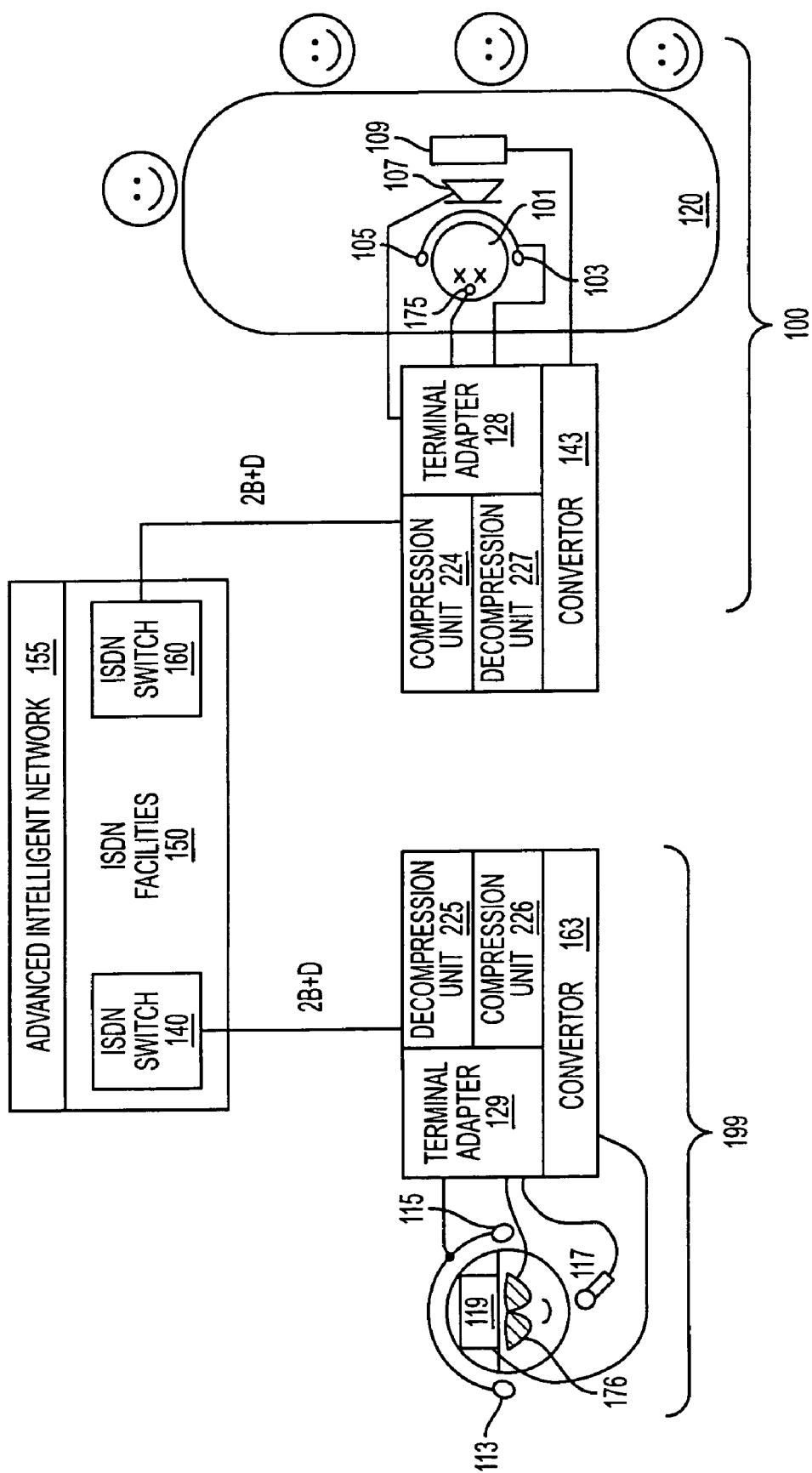
FIG. 1 shows a schematic of a spatial sound conference system using a dummy head in a conference room that transmits spatial sound to a participant at a remote location across ISDN facilities.

FIG. 1 shows a schematic of a spatial sound conference system using a dummy head in a conference room that transmits spatial sound to a participant at a remote location across ISDN facilities. Inside conference room station 100 is a dummy head 101 having at least two spatially disposed microphones 103, 105 placed at the right and left ear locations. The dummy head 101 may also contain a loudspeaker 107 at the mouth location, or a loudspeaker may be placed near the dummy head. The dummy head may also include shoulders or a torso. Advantageously, the dummy head may be placed directly on conference table 120 or on a chair in the conference room station or otherwise spatially situated at a conference location. Other conference participants may be situated about the conference room station, preferably equally spaced around conference table 120. According to an advantageous feature, the specialized equipment at conference room station 100 may be kept to a minimum. Alternatively, the conference room station may be designed as rooms for audiovisual conferences, long distance learning system classrooms, or virtual reality booths with the attendant equipment necessary for such applications.

The preferred embodiment is described in an ISDN environment; however, the invention may be implemented with other digital or analog communication channels as long as such channels can adequately handle the signal transmissions. In addition, various compression techniques can be used to reduce the transmission loads for such communication channels.

The spatially disposed microphones 103, 105 in the dummy head pick up audio signals including the speech of the teleconference participants in conference room station 100. Because of the physical configuration of the dummy head and the spatially disposed placement of the left and right microphones, the differences between the left and right microphone signals captures the spatial components of the sounds in the conference room 100.

In a preferred embodiment, a terminal adapter 128 converts the left and right microphone signals to digital data and sends the data across ISDN channels to ISDN facilities 150 that include ISDN switches 140, 160. Other digital or high bandwidth communication networks such as ADSL, a video network, or a full-service network, however, may be used to transmit signals between conference room station 100 and remote participant station 199. The two B channels of ISDN are capable of transmitting a bandwidth of 64 kbs each. Thus, the right microphone signal may be transmitted on one of the B channels, and the left microphone signal may be transmitted on the other B channel.

A compression unit 224 may apply standard compression algorithms, such as ISO MPEG Layer II or III or other compression algorithms compliant with CCITT (now ITU-T) standards G.722 or G.711, to the data signals to conform to the bandwidth restrictions of the communication network. If a communication network with a larger bandwidth is available, different compression algorithms may be used or compression may not be necessary. Telos Systems of Cleveland, Ohio creates a single unit housing an ISDN terminal adapter and a MPEG compression and decompression unit, which may be used in various embodiments of the spatial sound conference system.

At the receiving end of the network, the right and left signals are transmitted to a remote participant station 199 and the digital signals are decompressed using decompression unit 225 and converted back to analog using terminal adapter 129. Remote participant station 199 has spatially disposed loudspeakers 113, 115 such as a stereo headset or stereo loudspeakers for positioning close to the ears of a remote participant. The stereo loudspeakers may be embedded in a chair at the remote participant station. The spatial sounds reproduced by the loudspeakers allow a listener to distinguish speech from background noise more easily, primarily because speech has a recognizable point sound source while background noise tends to emanate from multiple non-point sources or from locations other than the speaker point source. Spatial sound allows isolation of the point sound source of speech or other audio signal. Also, by concentrating on a specific point sound source, a listener can isolate the speech of a single speaker even during periods of interruption or overtalk.

In a preferred embodiment, the remote participant station 199 also includes a microphone 117 for picking up the audio speech signals of a remote participant. The speech signal from the microphone 117 is converted to digital signals by terminal adapter 129, compressed using compression unit 226, sent across ISDN facilities 150 using either B-channel, decompressed using decompression unit 227, converted back to analog by terminal adapter 128, and played through loudspeaker 107 in the conference room station 100.

There will, however, be an echo effect due to a delay caused by the compression algorithms of the compression units 226, 224. A slight delay occurs when remote participant audio signals are compressed by compression unit 226. At conference room station 100, the remote participant audio signals are decompressed and played through loudspeaker 107. Microphones 103, 105 will pick up the remote participant audio signals as played and feed them back to remote participant station 199. Another slight delay occurs when compression unit 224 compresses the remote participant audio signals for feedback. The combined effect of these two compression-related delays, sound transfer delays between the loudspeaker 107 and microphones 103, 105, and any other delays may be perceptible by the remote participant. Adaptive or nonadaptive echo cancellation techniques may be used to reduce echoes resulting from compression delays and other time delays.

To improve the sound quality from the remote participant station 199, a second microphone may be used to capture stereo sound signals, and the stereo microphone signals could be sent across ISDN facilities using both B-channels. Stereo signals from remote participate station 199 may be played at conference room station 100 either on stereo loudspeakers for positioning close to the ears of each participant or on stereo headsets. The stereo loudspeakers may be positioned in chairs at the conference room station. Using stereo loudspeakers for each participant reduces the need for echo cancellation techniques, because the dummy head 101 should not pick up much feedback from the stereo loudspeakers for positioning close to the ears of the participants. The use of stereo headsets by each participant in conference room station 100 should eliminate the need for echo cancellation.

The remote participant station 199 may also include a head-tracking sensor 119. A head-tracking sensor can detect movements of a remote participant such as the pan and tilt of a remote participant's head. A sensor, such as one manufactured by Polhemus Navigation Sciences Division of McDonnell Douglas of Colchester, Vt., mounted on a headband can sense the movement of a head in the pan, tilt, and rotate axes. This movement information can be processed using convertor 163 and transmitted across ISDN facilities 150 using the 16 kbs D channel along with call signaling information. At the conference room station 100, the D channel may be connected to convertor 143 and then to a pan/tilt motorized unit 109 for controlling the dummy head 101. Thus, the dummy head may track the movements of a remote participant's head. Other servo arrangements may be utilized to replicate a remote participant's head orientation using the dummy head. This head-tracking feature greatly increases the spatialization ability of a remote participant. By directing the movement of the dummy head to face a particular speaker in conference room station 100, the remote participant can isolate and understand the speech of that participant, even if that participant is speaking very softly. Movement of the right and left microphones also provides additional spatialization cues to the remote listener to aid in locating and understanding participants within the conference room station.

Note that noise reduction may be useful to decrease the effects of any unwanted noise produced by motorized unit 109. A noise cancellation unit that cancels sound at the frequencies produced by the motorized unit should prevent the remote participant from hearing the motorized unit each time the remote participant moves. Other noise reduction methods may be available, such as placing the motorized unit a certain distance from the dummy head 101 and using a quiet belt drive to move the dummy head.

The movement of the dummy head increases the virtual presence of a remote participant at the conference room station 100. Thus, participants in the conference room station speak directly towards the dummy head when they wish to address a remote participant. The virtual presence may further be increased by adding a video component. A video camera 175 may be placed near the dummy head, preferably at the location of the eyes, to transmit images of the conference room station 100 to the remote participant station 199 across a network. The remote participant station may include a head-mounted display 176 to present the video image to a remote participant. Other displays or monitors, however, may be used. The video component may be added to the spatial sound conference system if bandwidth is available across the network, or if a video transmission cable connects the two stations together. Data compression algorithms such as ISO MPEG may be used to conform to the bandwidth limitations of the communication network, if needed.

An AIN 115 may overlay ISDN facilities 150 and allow participants to schedule a conference time, promote secure communications using caller identification information transmitted on the D-channel including voice recognition and passwords, or select a preferred dummy head configuration. AIN may have intelligent peripherals to enhance features of the spatial sound conference system by announcing new conference room station participants and demonstrating their virtual location as they join the spatial sound conference. Bellcore protocol 1129, or another protocol, may be used to establish a communication link between the intelligent peripheral and other machines in the AIN. An intelligent peripheral, such as a speech synthesizer or live operator, could make announcements emanating from a selected virtual location, such as directly above the remote participant. Also, a text intelligent peripheral could be used to display the name of each new participant on a computer monitor or an ISDN telephone display. Additionally, information on the D-channel could be used to create a computer display showing the conference table 120 and the names and faces of the conference room station participants.

AIN could also provide a private link to an intelligent peripheral so that a remote participant station 199 could request information, such as a list of present conference participants or the time that the conference started, using a telephone keypad or computer. Such information requests could result in an announcement from the selected virtual location heard only by the requestor. AIN features could be used in conjunction with not only a telephone keypad or a computer, but also a facsimile machine, or other electronic equipment. AIN features, such as those described, may be available in each embodiment of the spatial sound conference system.

Figure 1A:
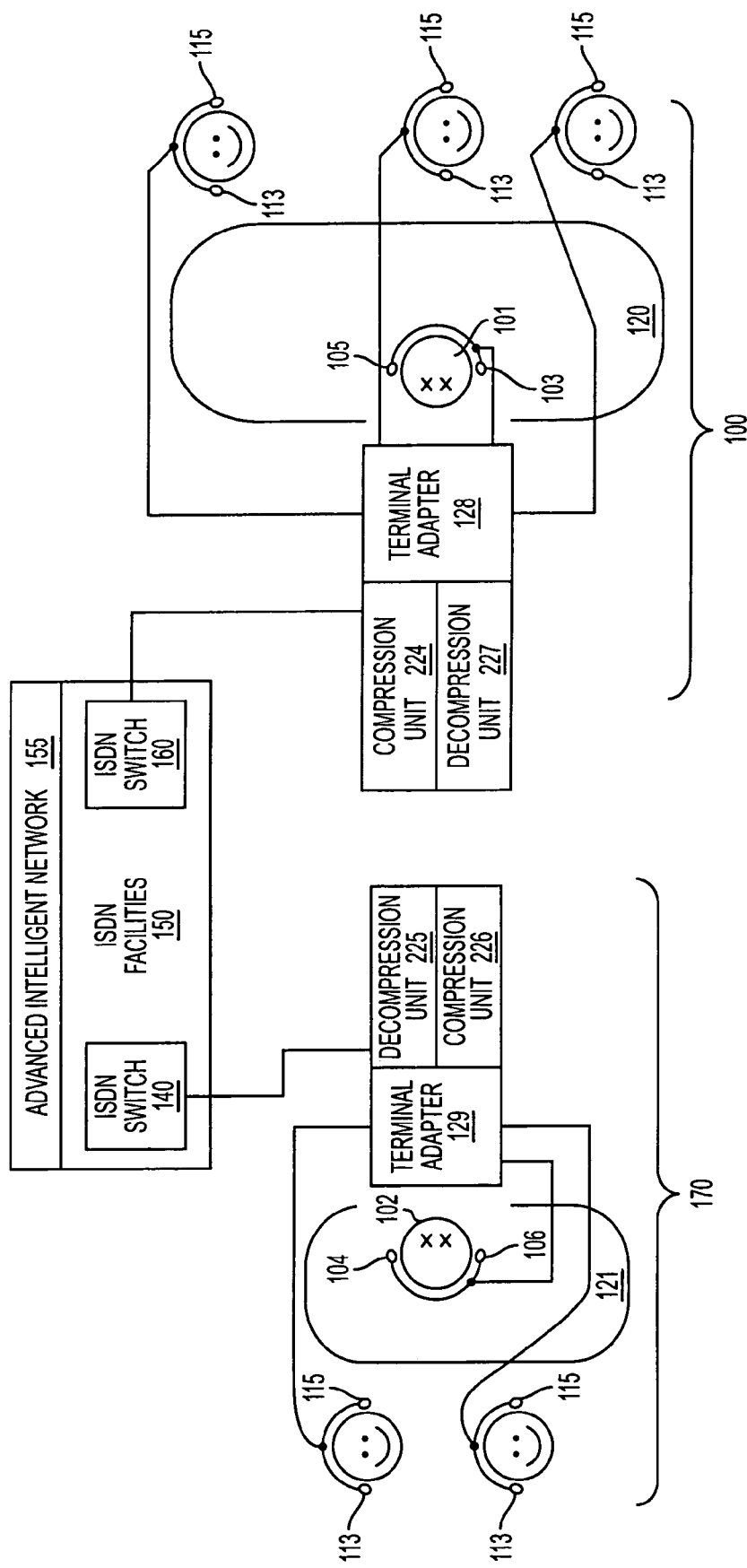
FIG. 1A shows a schematic of a many-to-many spatial sound conference using two dummy heads in two conference rooms.

FIG. 1A shows a schematic of a many-to-many spatial sound conference using two dummy heads in two conference rooms. Like FIG. 1, a conference room station 100 has a dummy head 101 with spatially disposed microphones 103, 105 connected to a terminal adapter 128 which is in turn connected to ISDN facilities 150 with ISDN switches 140, 160. Conference room station 170 is configured similarly with another dummy head 102 having spatially disposed microphones 104, 106 connected to another terminal adapter 129, which in turn in connected to ISDN facilities 150. Preferably, participants in one conference room 100 are positioned in a line (or semicircle) around conference table 120 to one side of the first dummy head 101, and participants in the other conference room 170 are positioned in a line (or semicircle) around conference table 121 to the other side of the second dummy head 102. Thus, each participant will have a unique virtual location during the spatial sound conference.

Instead of having a single loudspeaker broadcasting audio signals from the remote location, each participant in conference room stations 100, 170 has left and right spatial loudspeakers 113, 115. Preferably loudspeakers 113, 115 are located in a chair and positioned close to the participants ears to enable participants in the same conference room to hear each other directly. Spatial loudspeakers enable the spatial sound signals picked up by the dummy head in the remote conference room station to be properly replayed to impart spatial location cues. Like in the one-to-many spatial sound conference embodiment of FIG. 1, standard compression algorithms and compression and decompression units 224, 225, 226, 227 may be used to conform the audio signals to the available bandwidth and AIN 155 may be used to provide enhanced features to the spatial sound conference. Echo cancellation could also be useful in this embodiment. Thus, a many-to-many spatial sound conference may be implemented using two dummy heads in two conference room stations.

Figure 2:
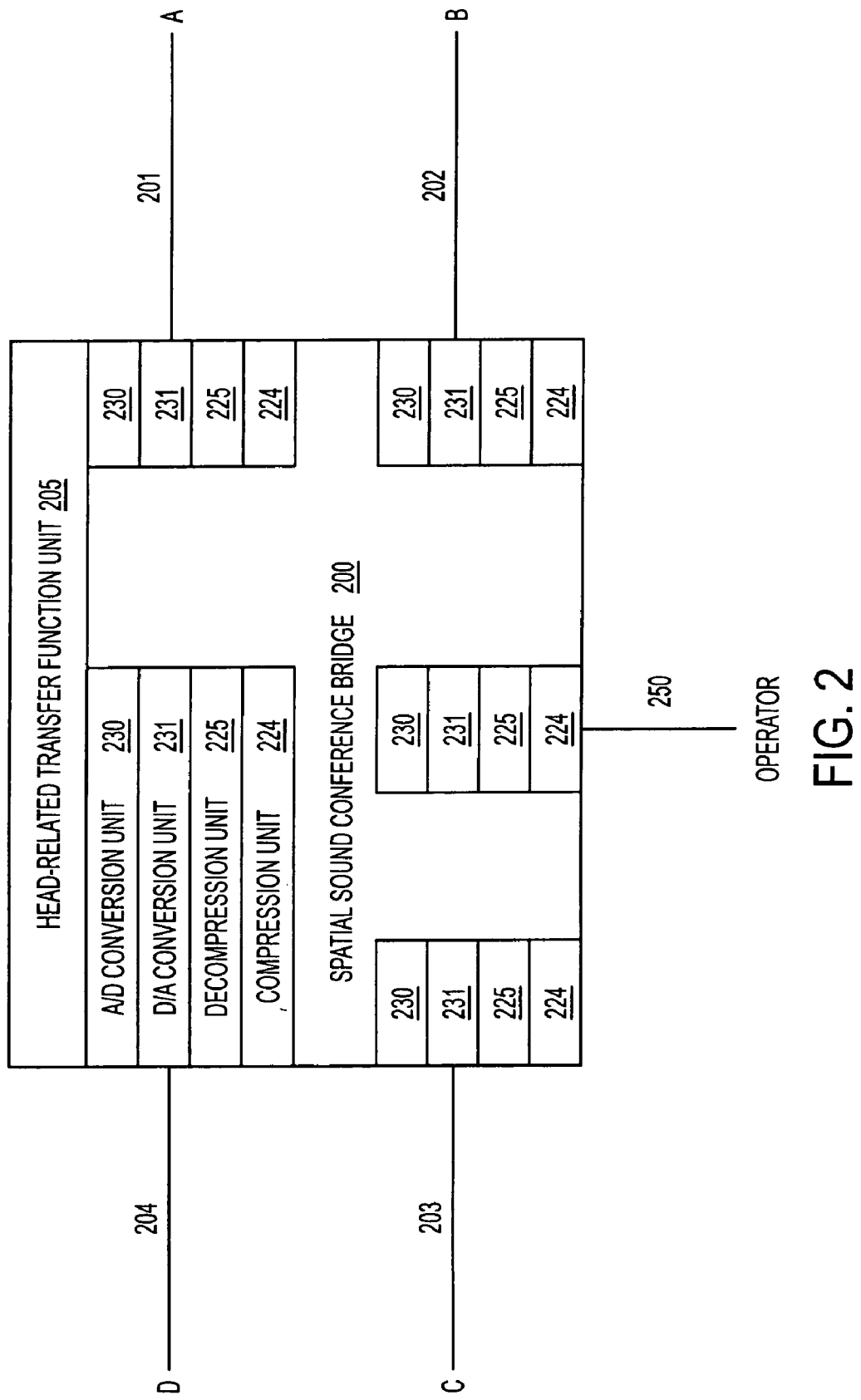
FIG. 2 shows a schematic of a spatial sound conference bridge used in a spatial sound conference system.

FIG. 2 shows a schematic of a spatial sound conference bridge used in a spatial sound conference system. As an alternative to use of a dummy head to capture spatialized sound components for right and left audio signals, a spatial sound conference bridge may be used to convolve head-related transfer functions with a monaural signal to create spatial signals. In a teleconference situation with single participants at multiple sites, a spatial sound conference bridge 200 containing a head-related transfer function unit 205 can be used to create a spatial sound conference system. In a preferred embodiment, the spatial sound conference bridge 200 receives a digital monaural signal via either B-channel from each conference participant station at ports 201, 202, 203, 204 connected to ISDN lines having 2 B-channels and a D-channel. The monaural signal may be either compressed or uncompressed depending upon the available bandwidth. If the incoming monaural signal is compressed, individual decompression unit 225 could be used to decompress the incoming signal. If one or more participants does not have a digital line to the conference bridge, an A/D conversion unit 230 in spatial sound conference bridge 200 could be used to digitize the incoming signal in preparation for convolution by the head-related transfer function unit 205.

A spatial sound conference bridge can accommodate as many participants as are necessary, simply by providing more ports. Also, a port 250 may be provided for a telephone operator. Based on which ports of the spatial sound conference bridge are active during a particular conference, the spatial sound conference bridge assigns a unique virtual location for each participant. The virtual locations of the conference participants could simulate the participants seated around a circular table. Other configurations could simulate the participants in a line, in a semicircle, or around a rectangular table.

In a preferred embodiment, depending on the virtual location of a participant, the spatial sound conference bridge selects a head-related transfer function relating to the relative virtual position of each participant. The head-related transfer function unit 205 processes the monaural signal from a participant and creates two new sound signals, one for each ear of a listener. The head-related transfer function unit 205 can be a signal processor, such as the Convolvotron available from Crystal River Engineering in Palo Alto, Calif. The two new sound signals combined create a spatialized sound signal. For example, the head-related transfer function imparting a spatialization of "two locations to the right" may be applied to the signal from port 201. The head-related transfer function imparting a spatialization of "one location to the right" may be applied to the signal from port 202. Correspondingly, the head-related transfer function of "one location to the left" may be applied to the signal from port 203, and the head-related transfer function of "two locations to the left" may be applied to the signal from port 204.

Once the head-related transfer function unit 205 has imparted the appropriate spatializations to the monaural signals from each participant, the spatial sound conference bridge compiles a composite signal for a particular participant station by combining the spatialized sound signals corresponding to all of the other participant stations. All composite signals do not need to be spatially consistent with each other as long as each composite signal spatially places the audio signals for each of the other participants. Thus, the composite signal sent from port 201 has spatialized sound signals based on the monaural signals from ports 202, 203, and 204. Similarly, the composite signal sent from port 202 has spatialized sound signals based on the monaural signals from ports 201, 203, and 204. Each composite signal is then sent to the proper participant station from ports 201, 202, 203, 204.

The outgoing composite signals may be compressed by compression unit 224 and transmitted to the participants via both B-channels. When received at each participant station, the composite signals are decompressed and played to a participant using spatially positioned loudspeakers. If a participant does not have a digital connection to the conference bridge, the conference bridge may also convert the outgoing composite signals to that participant using D/A conversion unit 231 before transmitting the composite signals.

Figure 2A:
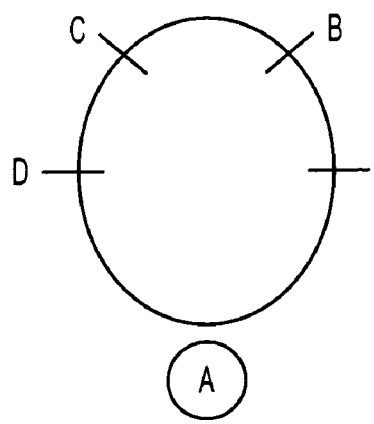
FIGS. 2A, 2B, 2C, and 2D show an example of virtual positions of conference participants.
Figure 2B:
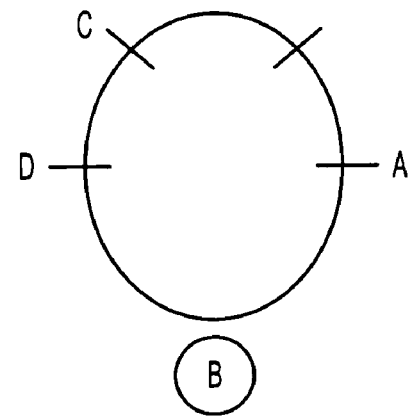
Figure 2C:
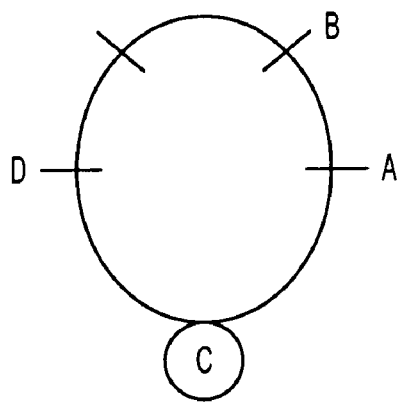
Figure 2D:
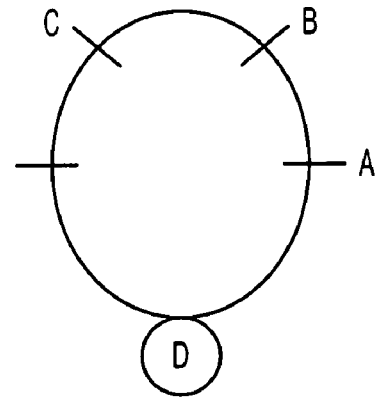
Figure 2E:
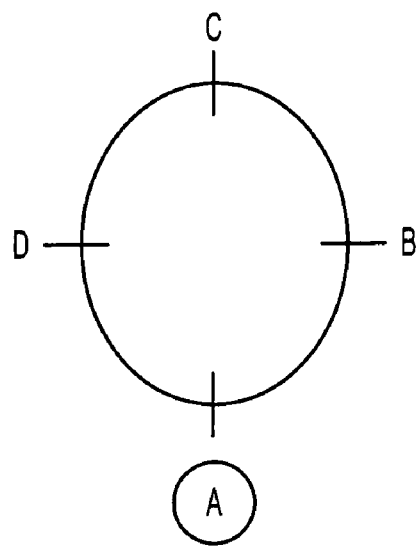
FIGS. 2E, 2F, 2G, and 2H show another example of virtual positions of conference participants.
Figure 2F:
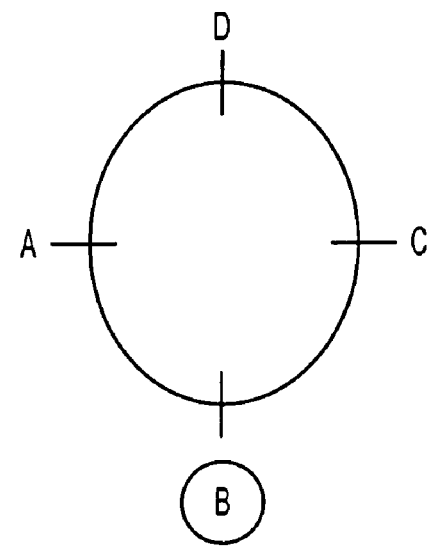
Figure 2G:
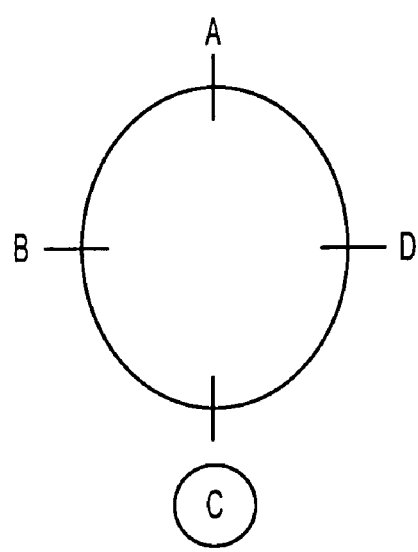
Figure 2H:
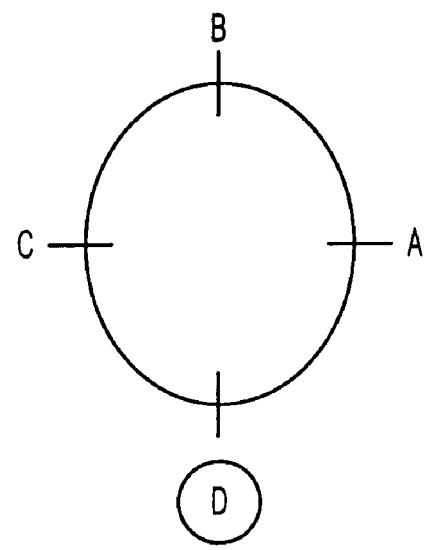

With this method, the virtual locations of the conference participants may be different from the perspective of each participant. FIGS. 2A, 2B, 2C, and 2D show an example of virtual positions of conference participants A, B, C, and D around a round conference table from the perspective of each individual participant. In FIG. 2A, the perspective of participant A is at the head of the virtual conference table. Participant B's virtual position is one seat to the right, participant C's virtual position is one seat to the left, and participant D's virtual position is two seats to the left. In FIG. 2B, the perspective of participant B is at the head of the virtual conference table. Participant A's virtual position is two seats to the right, and participants C and D have the same virtual position as in FIG. 2A. In FIGS. 2C and 2D, it can be seen that this method of virtually seating the participants results in minimal signal processing at the spatial sound conference bridge.

FIGS. 2E, 2F, 2G, and 2H show that the spatial sound conference bridge may also be used to establish consistent positions from the perspective of each conference participant at the cost of higher signal processing requirements. Head-related transfer functions may place participant B one seat to the right of participant A, participant D one seat to the left of participant A, and participant C across from participant A—from the perspective of all participants.

The spatial sound conference bridge may also have a variety of additional features such as adaptive or nonadaptive echo cancellation to reduce the effects of compression delays and other delays, reverberation settings to simulate various virtual room acoustics, or audio technique algorithms such as speaker crossover cancellation to optimize playback on spatially disposed loudspeakers as opposed to a headset.

Figure 3:
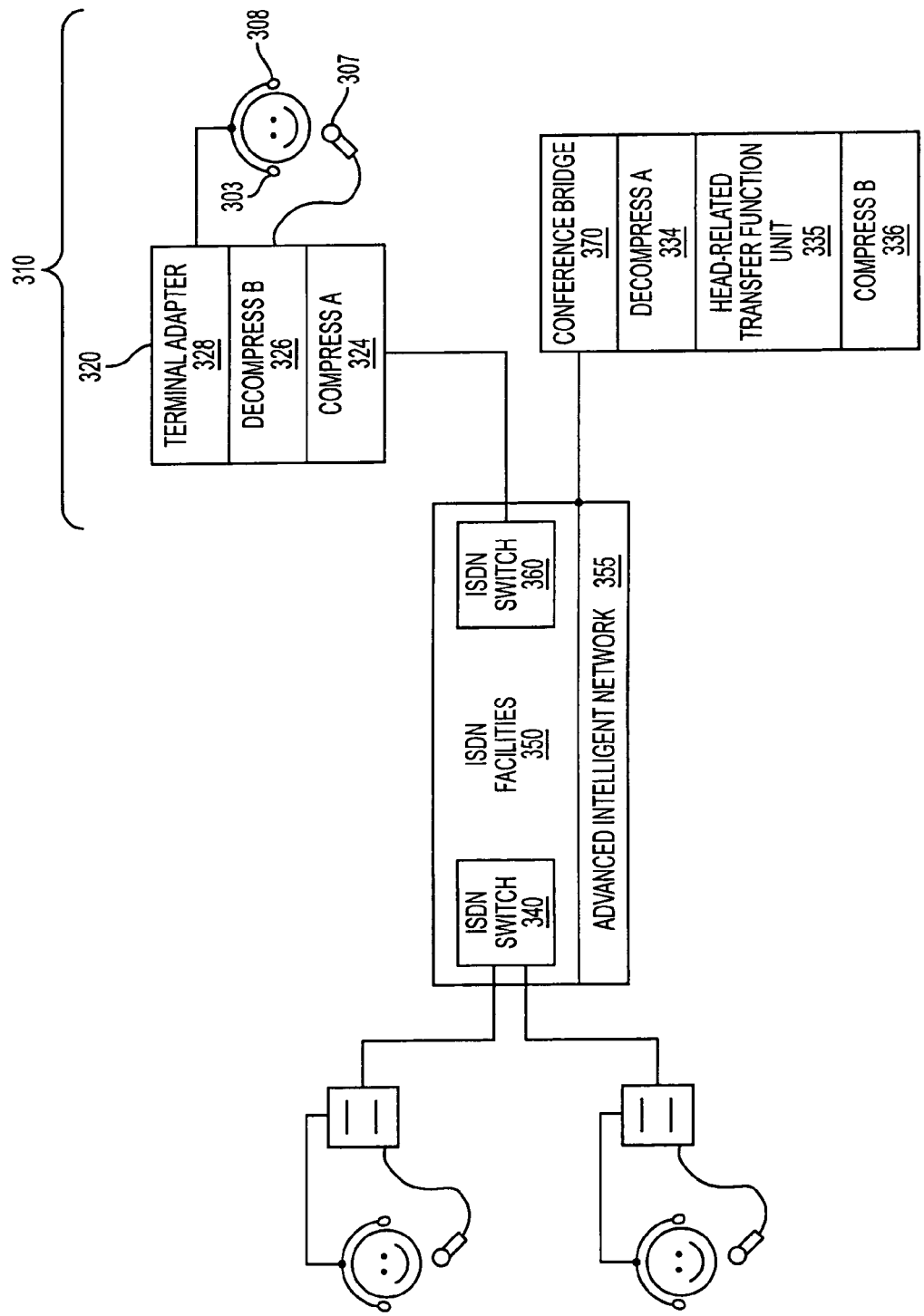
FIG. 3 shows a schematic of a spatial sound conference system implemented using a spatial sound conference bridge across ISDN facilities.

FIG. 3 shows a schematic of a spatial sound conference system implemented using a spatial sound conference bridge across ISDN facilities. A teleconference using this system links at least two participant stations. Each participant station 310 has right and left spatially disposed loudspeakers 303, 305 and a microphone 307. The right and left loudspeakers may be a stereo headset or loudspeakers for positioning close to the ears of a conference participant. A monaural audio signal from each participant station is picked up by microphone 307 and transmitted to a computer processor 320. Preferably, this processor is unobtrusively integrated into the participant station. This processor includes terminal adapter 328 which converts the monaural analog signal to a digital signal and compression A unit 324 for compressing the digital microphone signal. Conventional compression algorithms, such as ISO MPEG Layer II or III, may be used. Alternatively, compression may be omitted if enough bandwidth is available to transmit the uncompressed signal to the digital network.

Each participant station is connected to an ISDN switch 340, 360 that is part of ISDN facilities 350. A spatial sound conference bridge 370 is included in this configuration to impart a head-related transfer function to the monaural signal from each participant station. The spatial sound conference bridge 370 can be placed virtually anywhere in this configuration, such as connected to an ISDN switch 340, 360, connected at another ISDN location 350, or connected to a participant station 310.

An AIN 355 may overlay ISDN and may use information transmitted on the D-channel to allow participants to schedule a conference time, recreate a particular conference room setting using acoustic and reverberation information, select a preferred virtual conference table size and shape, reserve a particular position at a virtual conference table, select a spatial sound conference bridge based on availability or cost, or handle the connection and disconnection of conference participants. Also, because certain head-related transfer functions may produce better spatial separation for different conference participants, AIN may be used to construct or select a preferred head-related transfer function for an individual participant.

As described in the previous embodiments, AIN may use caller identification to promote secure access to a spatial sound conference. AIN intelligent peripherals can announce new participants and demonstrate each new participant's virtual location. Also, a text intelligent peripheral could be used to display the name of each new participant on a computer monitor or ISDN telephone display or create a computer display showing the virtual conference table and the names and faces of the conference participants. AIN could provide private links to an intelligent peripheral so that a participant could request information from the intelligent peripheral using a telephone keypad or computer. Such information requests could result in an announcement from the selected virtual location heard only by the requestor.

Digital monaural signals from each participant station 310 are transferred through ISDN facilities to a spatial sound conference bridge 370, wherever it is located in the system. If the digital monaural signals are compressed, the spatial sound conference bridge decompresses the monaural signals using a decompression A unit 334. Then, depending on the port of an incoming signal, the spatial sound conference bridge imparts a head-related transfer function to the signal to create a pair of spatial sound signals using head-related transfer-function unit 335. See FIG. 2 and accompanying description for a detailed explanation of the operation of the spatial sound conference bridge. The spatial sound conference bridge then compiles composite signals and compresses them using a compression B unit. Preferably, both compression A and compression B would use the ISO MPEG Layer II or III compression algorithm, however, compression A and compression B could be two different compression algorithms. Compression B may compress two spatialized audio channels or it may derive the difference between the two channels, thus allowing transmission of a single channel and a difference signal with or without further compression. Once the signals are compressed, the spatial sound conference bridge transmits the composite signals through the ports and directs these composite signals to the proper participant station.

At participant station 310, the composite signal is received and decompressed, using decompression B unit 326, into its constituent right and left spatial sound signals. These signals are converted to analog using terminal adapter 328 and sent to the left and right spatially disposed loudspeakers 303, 305 in the participant station 310. The compression, decompression, spatialization, and compilation may be carried out at various locations across the network or conference, depending on desired allocation and location of processing resources and transmission bandwidth.

Thus, the spatial sound conference system uses head-related transfer functions to impart spatial qualities to a teleconference implemented across a network. Sound spatialization may be imparted using a dummy head at a transmitting station, a spatial sound conference bridge, or a HRTF unit at a receiving station. This invention may, of course, be carried out in specific ways other than those set forth here without departing from the spirit and essential characteristics of the invention. Therefore, the presented embodiments should be considered in all respects as illustrative and not restrictive, and all modifications falling within the meaning and equivalency range of the appended claims are intended to be embraced therein.

We claim:
1. A spatial sound conference system comprising:
   a conference station comprising:
      right and left spatially disposed microphones positioned on a dummy head and connected to a communications channel for receiving right and left audio signals, wherein the differences between the right and left audio signals represent a head-related transfer function,
      a loudspeaker positioned proximal to the dummy head and connected through the communications channel to the microphone, and
      a position simulator attached to the dummy; and
   a remote station comprising:
      right and left spatially disposed loudspeakers connected to the communications channel,
      a microphone positioned in the remote station and connected to the communications channel for receiving a audio signal, and
      a head-tracking sensor in the remote station connected through the communications channel to the position simulator.

2. A spatial sound conference system according to claim 1, further comprising:
right and left spatially disposed loudspeakers positioned in the conference station and connected through the communications channel to the microphone positioned in the remote station.

3. A spatial sound conference system according to claim 1,
said conference station further comprising:
a compression unit for compressing the right and left audio signals; and said remote station further comprising:
a decompression unit for decompressing the compressed right and left audio signals.

4. A spatial sound conference system according to claim 3, wherein:
said compression unit is connected to the right and left spatially disposed microphones for compressing the right and left audio signals; and
said decompression unit is connected to the head-related transfer function unit for decompressing the compressed right and left audio signals.

5. A spatial sound conference system comprising:
a conference station including:
right and left spatially disposed microphones positioned on a dummy head and connected to a communications channel for receiving right and left audio signals, wherein the differences between the right and left audio signals represent a head-related transfer function, and
a position simulator attached to the dummy head; and
a remote station including:
right and left spatially disposed loudspeakers connected to the communications channel, and
a head-tracking sensor in the remote station connected to the communications channels
said position simulator attached to the dummy head and connected through the communications channel to the head tracking sensor.

6. A spatial sound conference system according to claim 5, further comprising:
a compression unit connected to right and left spatially disposed microphones for compressing the right and left audio signals; and
a decompression unit connected to the right and left spatially disposed loudspeakers for decompressing the compressed right and left audio signals.

7. A spatial sound conference system according to claim 5, further comprising:
a microphone positioned in the remote station and connected to the communications channel for receiving an audio signal; and
a loudspeaker positioned in the conference station and connected through the communications channel to the microphone.

8. A spatial sound conference system according to claim 7, further comprising:
a compression unit connected to the microphone positioned in the remote station for compressing the audio signal; and
a decompression unit connected to the loudspeaker positioned in the conference station for decompressing the compressed audio signal.

9. A spatial sound conference system according to claim 5, further comprising:
a video camera positioned in the conference station and connected to the communications channel for receiving a video image; and
a display positioned in the remote station and connected through the communications channel to the video camera.

10. A spatial sound conference system according to claim 9, wherein the video camera is positioned near the location of eyes on a dummy head.

11. A spatial sound conference system according to claim 9, wherein the display is a head-mounted display.

12. A spatial sound conference system according to claim 5, wherein the right and left spatially disposed loudspeakers are a headset.

13. A method for conducting a spatial sound conference comprising the steps of:
detecting movements of a conference participant at a remote station to provide movement information;
transmitting said movement information to a conference station;
controlling a dummy head at said conference station in response to said movement information;
converting audio information into right and left audio signals at said conference station, wherein the conversion imparts a differential characteristic to the right and left audio signals, and the differential characteristic is represented by a head-related transfer function, and the right and left audio signals comprise spatialized audio;
transmitting audio information representative of said spatialized audio from the conference station across a communications channel to a remote station; and
playing the spatialized audio in the remote station.

14. A method for conducting a spatial sound conference according to claim 13, further comprising the steps of:
compressing the right and left audio signals after the step of converting; and
decompressing the compressed right and left audio signals after the step of transmitting.

* * * * *